US011878524B2

(12) United States Patent
Mizuno

(10) Patent No.: US 11,878,524 B2
(45) **Date of Patent: *Jan. 23, 2024**

(54) LIQUID DISCHARGE HEAD

(71) Applicant: Brother Kogyo Kabushiki Kaisha, Nagoya (JP)

(72) Inventor: Taisuke Mizuno, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,776

(22) Filed: Feb. 27, 2023

(65) Prior Publication Data

US 2023/0219341 A1 Jul. 13, 2023

Related U.S. Application Data

(63) Continuation of application No. 16/704,313, filed on Dec. 5, 2019, now Pat. No. 11,613,120.

(30) Foreign Application Priority Data

Jan. 31, 2019 (JP) ................................ 2019-015407

(51) Int. Cl.
*B41J 2/14* (2006.01)
*B41J 2/18* (2006.01)

(52) U.S. Cl.
CPC ....... *B41J 2/14201* (2013.01); *B41J 2/14233* (2013.01); *B41J 2/18* (2013.01); (Continued)

(58) Field of Classification Search
CPC ...... B41J 2/14201; B41J 2/14233; B41J 2/18; B41J 2002/14459; B41J 2202/11; B41J 2202/12
See application file for complete search history.

(56) References Cited

U.S. PATENT DOCUMENTS 9,688,076 B2 6/2017 Sugahara et al.
9,950,538 B2 4/2018 Sugahara et al.
(Continued)

FOREIGN PATENT DOCUMENTS

EP 3246163 A1 11/2017
JP 2009-247938 A 10/2009
(Continued)

OTHER PUBLICATIONS

Dec. 20, 2022—(JP) Notice of Reasons for Refusal—JP App 2019-015407, Eng Tran.

*Primary Examiner* — Geoffrey S Mruk
(74) *Attorney, Agent, or Firm* — Banner & Witcoff, Ltd.

(57) ABSTRACT

A liquid discharge head includes: a first pressure chamber group formed by pressure chambers arranged in a first direction; a second pressure chamber group formed by pressure chambers arranged in the first direction, and disposed side by side with the first pressure chamber group in a second direction; a first common channel extending in the first direction and communicating with the pressure chambers composing the first pressure chamber group; a second common channel extending in the first direction and communicating with the pressure chambers composing the second pressure chamber group; a first dummy pressure chamber disposed on one side in the first direction relative to the first pressure chamber group; and a second dummy pressure chamber disposed on the one side in the first direction relative to the second pressure chamber group.

4 Claims, 10 Drawing Sheets

(52) U.S. Cl.
CPC .. *B41J 2002/14459* (2013.01); *B41J 2202/11* (2013.01); *B41J 2202/12* (2013.01)

(56) References Cited

U.S. PATENT DOCUMENTS

| | | | |
|---|---|---|---|
| 10,357,966 B2 | 7/2019 | Ito et al. | |
| 11,613,120 B2 * | 3/2023 | Mizuno ................ | B41J 2/14233 137/255 |
| 2011/0134174 A1 | 6/2011 | Seto | |
| 2016/0288499 A1 | 10/2016 | Sugahara et al. | |
| 2017/0259579 A1 | 9/2017 | Sugahara et al. | |
| 2018/0264807 A1 | 9/2018 | Ito et al. | |
| 2019/0299615 A1 | 10/2019 | Sugiura | |
| 2019/0329559 A1 | 10/2019 | Ozawa | |

FOREIGN PATENT DOCUMENTS

| | | |
|---|---|---|
| JP | 2011-121211 A | 6/2011 |
| JP | 2011-245795 A | 12/2011 |
| JP | 2016-159514 A | 9/2016 |
| JP | 2016-190431 A | 11/2016 |
| JP | 2018-103418 A | 7/2018 |
| JP | 2018-153921 A | 10/2018 |
| JP | 2019-177596 A | 10/2019 |
| WO | 2018/181024 A1 | 10/2018 |

* cited by examiner

LIQUID DISCHARGE HEAD

REFERENCE TO RELATED APPLICATIONS

The present application is a continuation of U.S. patent application Ser. No. 16/704,313 filed on Dec. 5, 2019 (now U.S. Pat. No. 11,613,120), which claims priority from Japanese Patent Application No. 2019-015407 filed on Jan. 31, 2019, the disclosures of which are incorporated herein by reference in their entirety.

BACKGROUND ART

The present disclosure relates to a liquid discharge head including two pressure chamber groups and two common channels provided for the two pressure chamber groups.

There is known a liquid discharge head including two pressure chamber groups each of which is formed by pressure chambers arranged in a first direction and two common liquid chambers (common channels) provided for the two pressure chamber groups. In the above liquid discharge head, the two common liquid chambers (common channels) communicate with each other via a connection channel connected to ends in the first direction of the respective common liquid chambers.

DESCRIPTION

In the above liquid discharge head, liquid can circulate between the two common liquid chambers (common channels) via the connection channel. The connection channel, however, is positioned outside the ends in the first direction of the respective common liquid chambers, which results in a large dimension in the first direction of the liquid discharge head.

An object of the present disclosure is to provide a liquid discharge head that allows liquid to circulate between two common channels without making a dimension in a first direction of the liquid discharge head large.

According to an aspect of the present disclosure, there is provided a liquid discharge head, including: a first pressure chamber group formed by a plurality of pressure chambers arranged in a first direction; a second pressure chamber group formed by a plurality of pressure chambers arranged in the first direction, and disposed side by side with the first pressure chamber group in a second direction intersecting with the first direction; a first common channel extending in the first direction and communicating with the pressure chambers composing the first pressure chamber group; a second common channel extending in the first direction and communicating with the pressure chambers composing the second pressure chamber group, the second common channel and the first common channel being arranged in the second direction; a first dummy pressure chamber disposed at one side in the first direction relative to the first pressure chamber group; and a second dummy pressure chamber disposed at the one side in the first direction relative to the second pressure chamber group, wherein the first common channel and the second common channel communicate with each other via the first dummy pressure chamber and the second dummy pressure chamber.

FIRST EMBODIMENT

Figure 1:
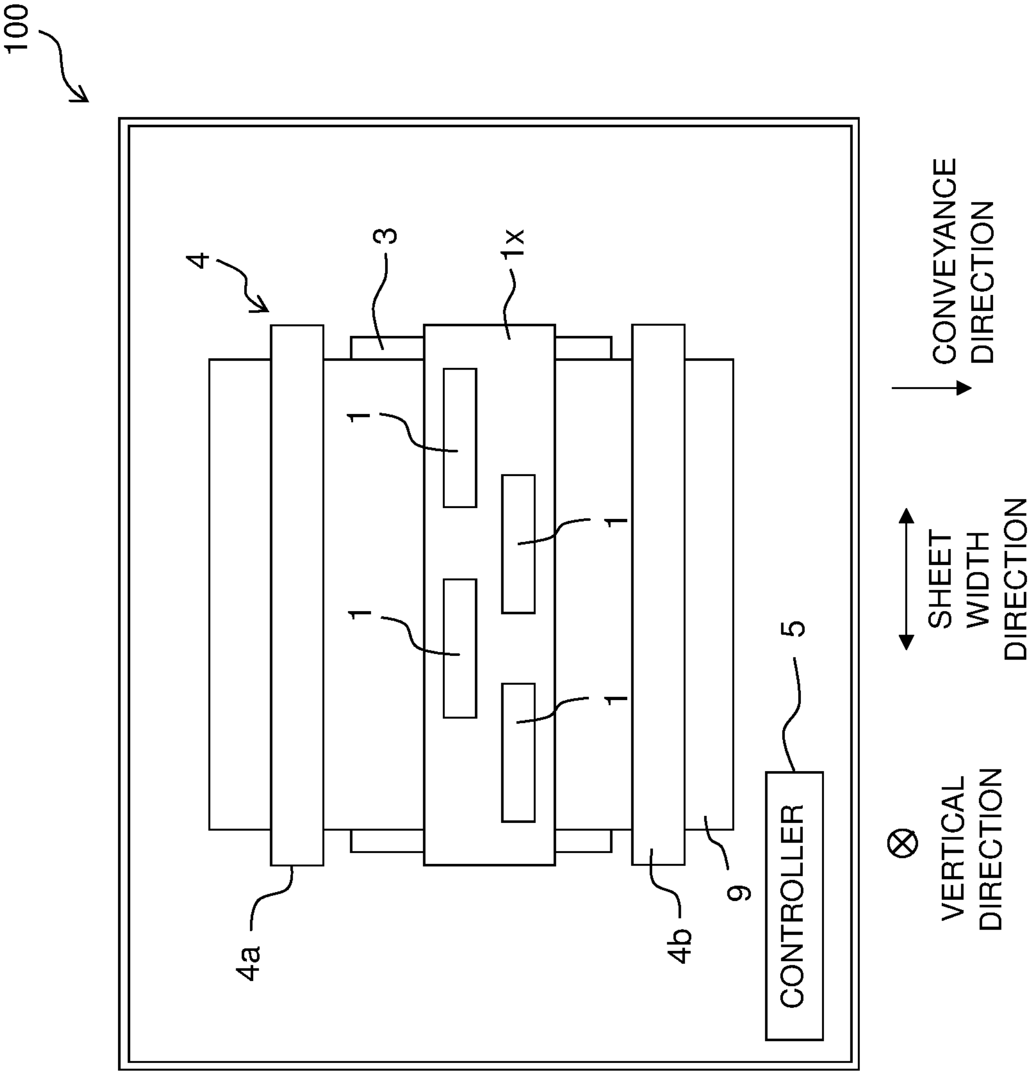
FIG. 1 is a plan view of a printer including heads according to the first embodiment of the present disclosure.

Referring to FIG. 1, a schematic configuration of a printer 100 including heads 1 according to the first embodiment of the present disclosure is explained.

The printer 100 includes a head unit 1*x* including the four heads 1, a platen 3, a conveyer 4, and a controller 5.

A sheet 9 is placed on an upper surface of the platen 3.

Figure 5:
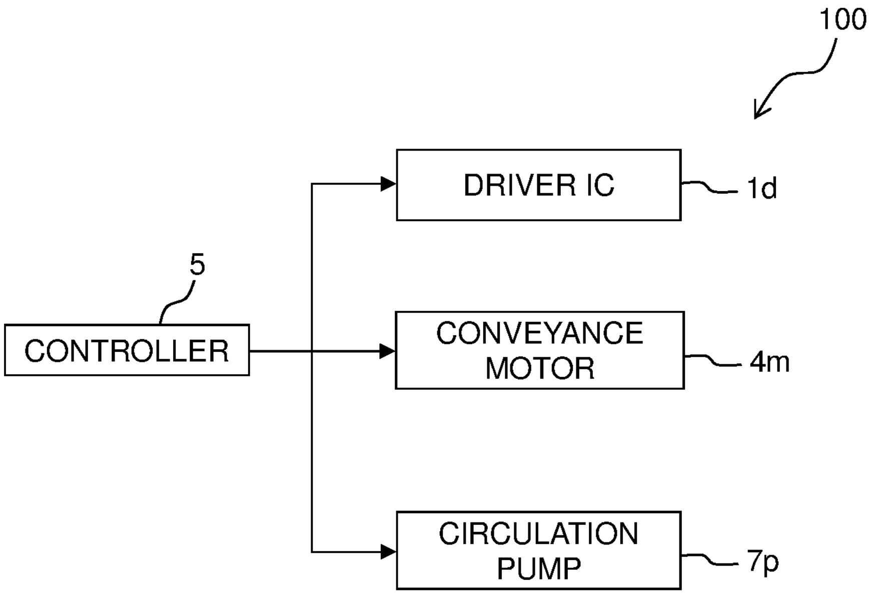
FIG. 5 is a block diagram of an electrical configuration of the printer.

The conveyer 4 includes two roller pairs 4*a* and 4*b* arranged with the platen 3 interposed therebetween in a conveyance direction. Driving a conveyance motor 4*m* (see FIG. 5) by the controller 5 rotates the roller pairs 4*a* and 4*b* with the sheet 9 nipped therebetween, thereby conveying the sheet 9 in the conveyance direction.

The head unit 1*x* is long in a sheet width direction (a direction orthogonal to the conveyance direction and a vertical direction). The head unit 1*x* is a line-type head unit in which ink is discharged from nozzles 21 (see FIGS. 2 and 3) on the sheet 9 in a state that the head unit 1*x* is fixed or secured to the printer 100. The four heads 1 are arranged zigzag in the sheet width direction.

The controller 5 includes a Read Only Memory (ROM), a Random Access Memory (RAM), and an Application Specific Integrated Circuit (ASIC). The ASIC executes recording processing and the like in accordance with programs stored in the ROM. In the recording processing, the controller 5 controls the driver IC 1*d* for each head 1 and the conveyance motor 4*m* (see FIG. 5) based on a recording instruction (including image data) input from an external apparatus, such as a PC, to record an image on the sheet 9.

Subsequently, referring to FIGS. 2 to 4, a configuration of the head 1 is explained.

Figure 3:
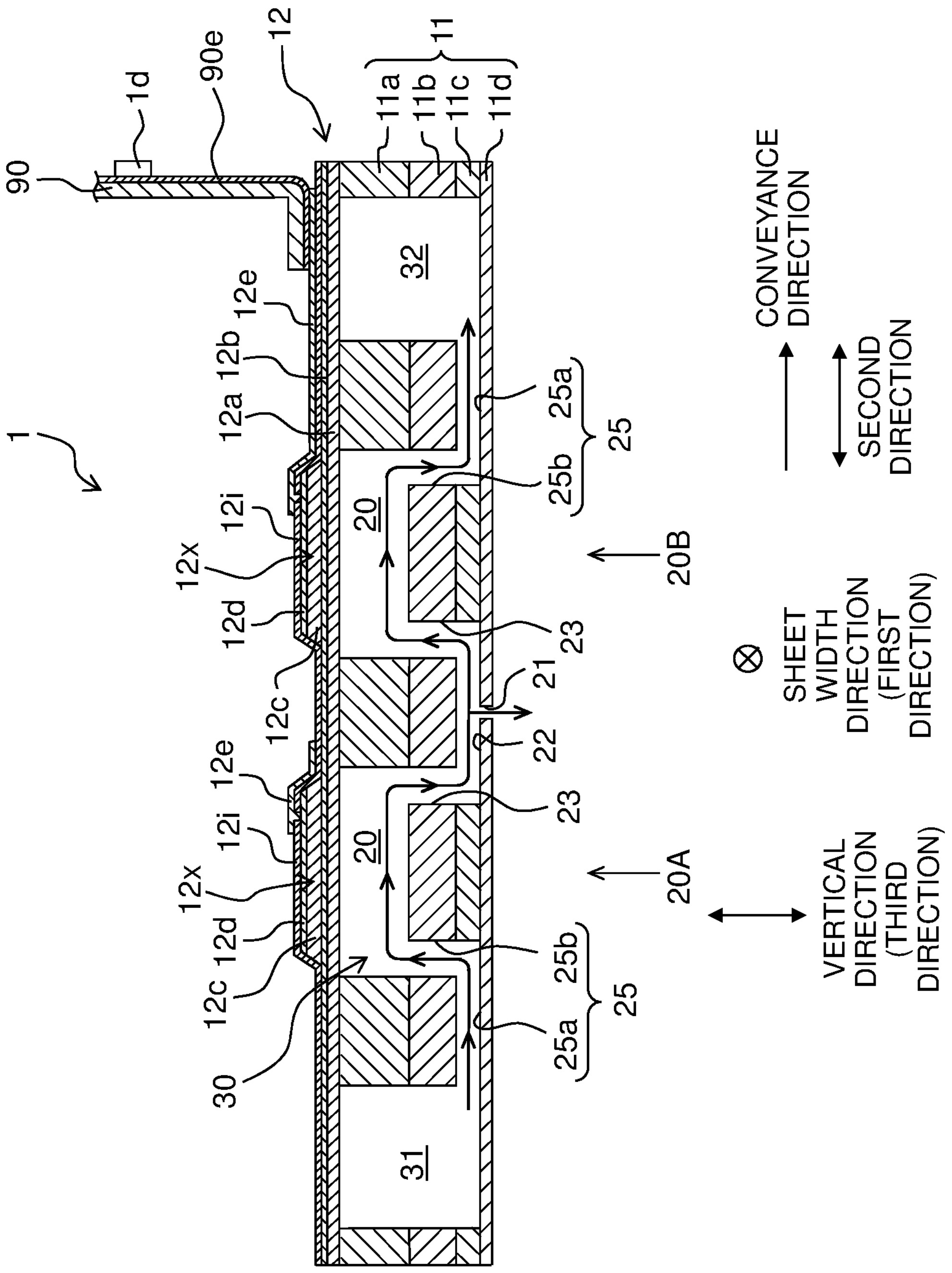
FIG. 3 is a cross-sectional view of the head taken along a line in FIG. 2.

As depicted in FIG. 3, the head 1 includes a channel substrate 11, an actuator substrate 12 that is fixed to an upper surface of the channel substrate 11, and a trace substrate 90 that is fixed to the actuator substrate 12.

Figure 2:
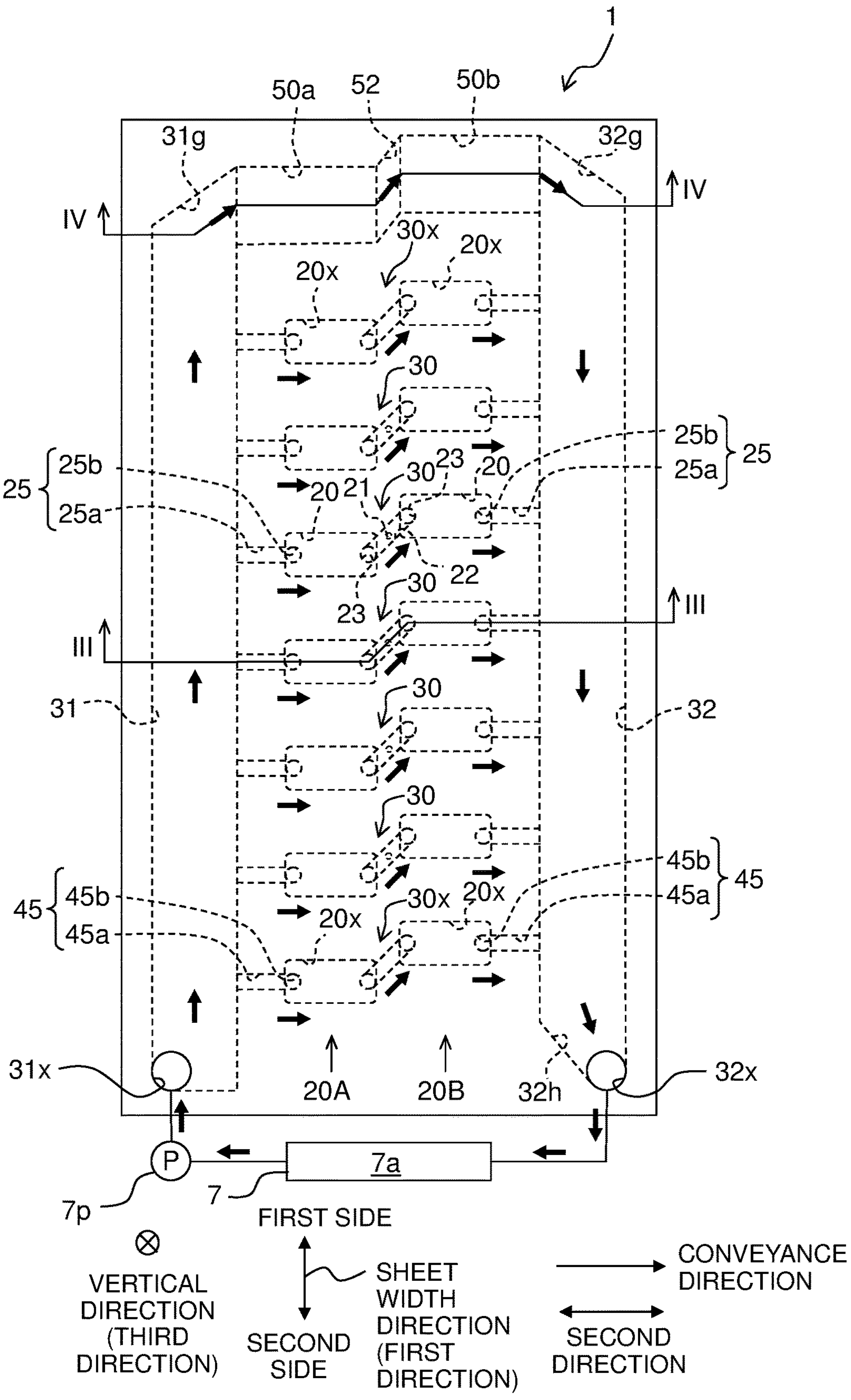
FIG. 2 is a plan view of the head.

As depicted in FIG. 2, the channel substrate 11 includes individual channels 30, two dummy individual channels 30*x*, two dummy pressure chambers 50*a* and 50*b*, a connection route 52, a supply channel 31, and a return channel 32.

The dummy pressure chamber 50*a* corresponds to a first dummy pressure chamber of the present disclosure, and the dummy pressure chamber 50*b* corresponds to a second dummy pressure chamber of the present disclosure. The supply channel 31 corresponds to a first common channel of the present disclosure, and the return channel 32 corresponds to a second common channel of the present disclosure.

The individual channels 30 are arranged in a row in the sheet width direction (first direction). Each individual channel 30 includes two pressure chambers 20, one nozzle 21, one communicating route 22, two connection channels 23, and two coupling channels 25.

The two pressure chambers 20 included in each individual channel 30 are separated from each other in a second direction parallel to the conveyance direction. One of the two pressure chambers 20 is shifted in the first direction from the other. One of the two pressure chambers 20 (a pressure chamber disposed at the left in FIG. 2) belongs to a first pressure chamber group 20A, the other (a pressure chamber disposed at the right in FIG. 2) belongs to a second pressure chamber group 20B. The first pressure chamber group 20A and the second pressure chamber 20B are arranged in the second direction. Each of the groups 20A and 20B is formed by the pressure chambers 20 arranged in a row in the first direction at regular intervals.

One of the dummy individual channels 30$x$ is disposed at a first side in the first direction (the top of FIG. 2) for the individual channels 30, and the other is disposed at a second side in the first direction (the bottom of FIG. 2) for the individual channels 30. The dummy individual channels 30$x$ have the same configuration as the individual channels 30 except that the dummy individual channels 30$x$ include no nozzle 21. Parts of the dummy individual channel 30$x$ corresponding to the pressure chambers 20 are referred to as dummy pressure chambers 20$x$. The dummy pressure chambers 20$x$ have the same dimension as the pressure chambers 20. The dummy pressure chambers 20$x$ are arranged in the first direction at the same pitch as the pressure chambers 20 belonging to the pressure chamber groups 20A and 20B. The dummy pressure chambers 20$x$ correspond to another dummy pressure chamber of the present disclosure.

The dummy pressure chambers 50$a$ and 50$b$ are arranged at the first side in the first direction (the top of FIG. 2) relative to the individual channels 30 with one dummy individual channel 30$x$ interposed therebetween.

The dummy pressure chamber 50$a$ is disposed at the first side in the first direction (the top of FIG. 2) relative to the pressure chambers 20 belonging to the first pressure chamber group 20A. One dummy pressure chamber 20$x$ is disposed between the dummy pressure chamber 50$a$ and the pressure chambers 20 belonging to the first pressure chamber group 20A in the first direction. The dummy pressure chamber 50$a$, the pressure chambers 20 belonging to the first pressure chamber group 20A, and the dummy pressure chambers 20$x$ corresponding to the first pressure chamber group 20A are aligned in the first direction.

The dummy pressure chamber 50$b$ is disposed at the first side in the first direction (the top of FIG. 2) relative to the pressure chambers 20 belonging to the second pressure chamber group 20B. One dummy pressure chamber 20$x$ is disposed between the dummy pressure chamber 50$b$ and the pressure chambers 20 belonging to the second pressure chamber group 20B in the first direction. The dummy pressure chamber 50$b$, the pressure chambers 20 belonging to the second pressure chamber group 20B, and the dummy pressure chambers 20$x$ corresponding to the second pressure chamber group 20B are aligned in the first direction.

Similar to the two pressure chambers 20 included in each individual channel 30, the dummy pressure chambers 50$a$ and 50$b$ are separated from each other in the second direction, and the dummy pressure chamber 50$a$ is shifted in the first direction from the dummy pressure chamber 50$b$.

The dummy pressure chambers 50$a$ and 50$b$ are greater in volume than the pressure chambers 20. Specifically, as depicted in FIG. 2, a planer dimension orthogonal to the vertical direction (a third direction orthogonal to the first direction and the second direction) of the dummy pressure chambers 50$a$ and 50$b$ is greater than that of the pressure chambers 20. Further, as depicted in FIGS. 3 and 4, a depth (a length in the third direction) of the dummy pressure chambers 50$a$ and 50$b$ is greater than that of the pressure chambers 20.

Although the pressure chambers 20 communicate with the nozzles 21, the dummy pressure chambers 20$x$, 50$a$, and 50$b$ do not communicate with the nozzles 21.

As depicted in FIG. 2, the connection route 52 connects the dummy pressure chamber 50$a$ and the dummy pressure chamber 50$b$. The connection route 52 extends in an oblique direction (a direction orthogonal to the third direction and intersecting with the first direction and the second direction). A length in the first direction of the connection route 52 is the same as that of the dummy pressure chambers 50$a$ and 50$b$. As depicted in FIG. 4, a depth (a length in the third direction) of the connection route 52 is the same as that of the dummy pressure chambers 50$a$ and 50$b$. A position in the third direction of the connection route 52 is the same as that of the dummy pressure chambers 50$a$ and 50$b$.

As depicted in FIG. 2, the supply channel 31 and the return channel 32 extend in the first direction and they are arranged in the second direction. The individual channels 30, the dummy individual channels 30$x$, the dummy pressure chambers 50$a$ and 50$b$, and the connection route 52 are arranged between the supply channel 31 and the return channel 32 in the second direction.

The supply channel 31 communicates with the pressure chambers 20 belonging to the first pressure chamber group 20A. The return channel 32 communicates with the pressure chambers 20 belonging to the second pressure chamber group 20B. The supply channel 31 communicates with the return channel 32 via the dummy pressure chambers 50$a$ and 50$b$.

An end on the first side in the first direction (the top of FIG. 2) of the supply channel 31 is defined by a guide surface 31$g$. An end on the first side in the first direction (the top of FIG. 2) of the return channel 32 is defined by a guide surface 32$g$.

Each of the guide surfaces 31$g$ and 32$g$ extends in an oblique direction (a direction orthogonal to the third direction and intersecting with the first direction and the second direction). The guide surfaces 31$g$ and 32$g$ are arranged symmetrically with respect to a virtual straight line extending in the first direction. Specifically, the guide surface 31$g$ is inclined to the first direction so that a portion closer to the first side in the first direction (the top of FIG. 2) is closer in the second direction to the return channel 32 than a portion closer to the second side in the first direction (the bottom of FIG. 2). The guide surface 32$g$ is inclined to the first direction so that a portion closer to the first side in the first direction (the top of FIG. 2) is closer in the second direction to the supply channel 31 than a portion closer to the second side in the first direction (the bottom of FIG. 2).

The guide surface 31$g$ does not overlap in the second direction with any of the pressure chambers 20 composing the first pressure chamber group 20A. The guide surface 31$g$ overlaps in the second direction with the dummy pressure chamber 50$a$. The guide surface 32$g$ does not overlap in the second direction with any of the pressure chambers 20 composing the second pressure chamber group 20B. The guide surface 32$g$ overlaps in the second direction with the dummy pressure chamber 50$b$.

An end on the second side in the first direction (the bottom of FIG. 2) of the return channel 32 is defined by a return guide surface 32$h$.

Similar to the guide surface 32*g*, the return guide surface 32*h* extends in an oblique direction (a direction orthogonal to the third direction and intersecting with the first direction and the second direction). Specifically, the return guide surface 32*h* is inclined to the first direction so that a portion closer to the first side in the first direction (the top of FIG. 2) is closer in the second direction to the supply channel 31 than a portion closer to the second side in the first direction (the bottom of FIG. 2). A return opening 32*x* is disposed at an end at the second side in the first direction (the bottom of FIG. 2) of the return guide surface 32*h*.

The return guide surface 32*h* does not overlap in the second direction with any of the pressure chambers 20 belonging to the second pressure chamber group 20B.

The supply channel 31 communicates with a storage chamber 7*a* of a subtank 7 via a supply opening 31*x*. The return channel 32 communicates with the storage chamber 7*a* via the return opening 32*x*. The supply opening 31*x* is formed at an end at the second side in the first direction (the bottom of FIG. 2) of the supply channel 31. The return opening 32*x* is formed at the end at the second side in the first direction (the bottom of FIG. 2) of the return channel 32.

The storage chamber 7*a* communicates with a main tank (not depicted) that stores ink. The storage chamber 7*a* stores the ink supplied from the main tank.

In each individual channel 30, each of the two pressure chambers 20 has a substantially rectangular shape that is long in the second direction in a plane orthogonal to the vertical direction. The coupling channel 25 is coupled to a first end in the second direction of the pressure chamber 20, and the connection channel 23 is coupled to a second end in the second direction of the pressure chamber 20.

The coupling channel 25 couples the supply channel 31 or the return channel 32 with the first end in the second direction of the pressure chamber 20. As depicted in FIG. 3, the coupling channel 25 has a horizontal portion 25*a* coupled to the supply channel 31 or the return channel 32 and extending in a horizontal direction and a vertical portion 25*b* extending upward from a front end of the horizontal portion 25*a* and coupled to the first end in the second direction of the pressure chamber 20. The horizontal portion 25*a* extends in the second direction.

The connection channel 23 extends downward from the second end in the second direction of the pressure chamber 20. The communicating route 22 connects lower ends of the two connection channels 23.

One of the two connection channels 23 connected to the pressure chamber 20 belonging to the first pressure chamber group 20A corresponds to a first connection channel of the present disclosure. The other of the two connection channels 23 connected to the pressure chamber 20 belonging to the second pressure chamber group 20B corresponds to a second connection channel of the present disclosure.

Similar to the connection route 52, the communicating route 22 extends in an oblique direction (a direction orthogonal to the third direction and intersecting with the first direction and the second direction). The communicating route 22 is a channel passing immediately above the nozzle 21. The nozzle 21 is disposed at a center portion in the oblique direction of the communicating route 22.

Each of the pressure chambers 20 communicates with the nozzle 21 via the corresponding one of the connection channels 23 and the communicating route 22. The two pressure chambers 20 communicate with each other via the two connection channels 23 and the communicating route 22.

Figure 4:
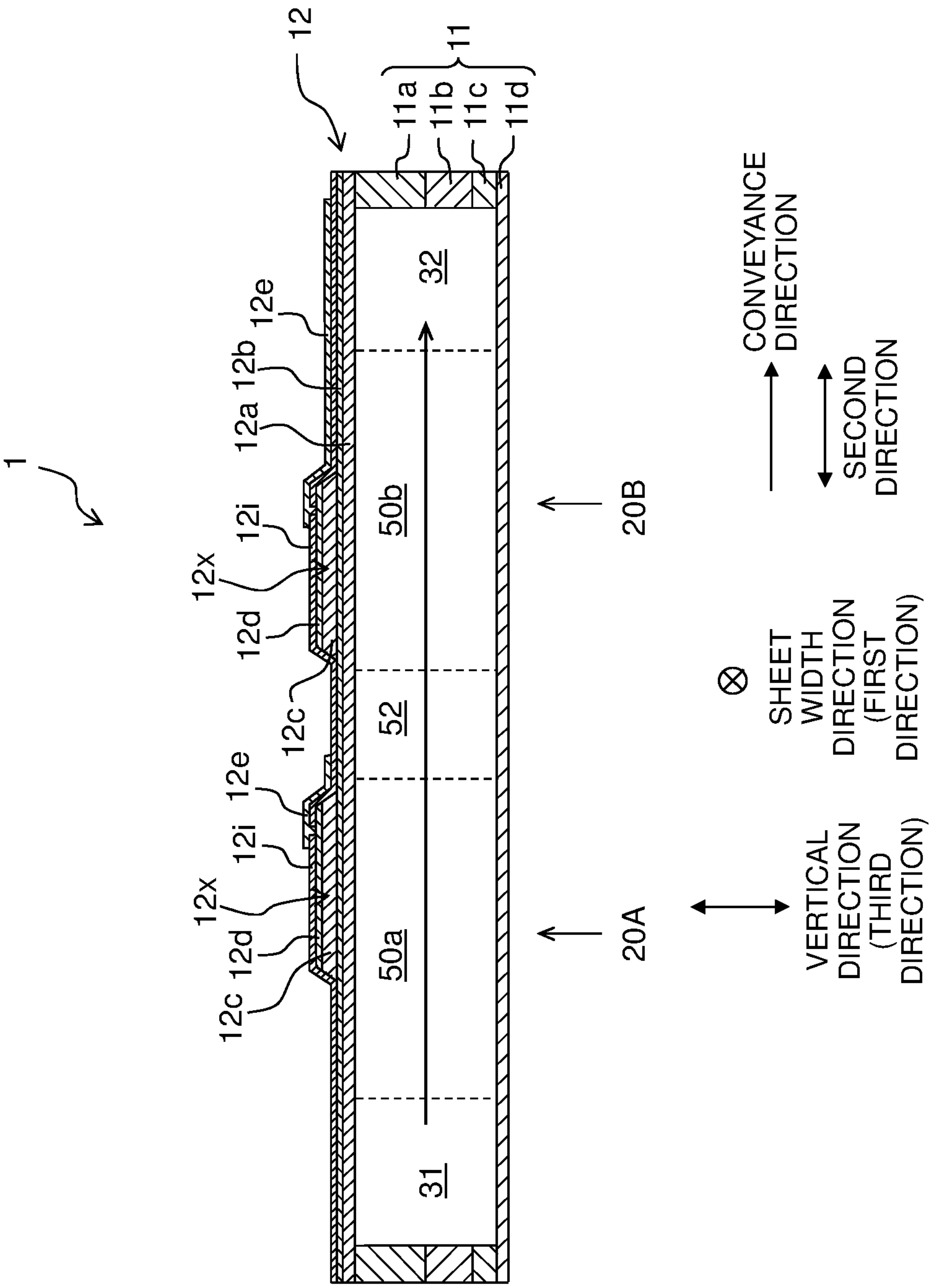
FIG. 4 is a cross-sectional view of the head taken along a line IV-IV in FIG. 2.

As depicted in FIGS. 3 and 4, the channel substrate 11 has four plates 11*a* to 11*d* stacked on top of each other in the vertical direction.

As depicted in FIG. 4, the supply channel 31, the return channel 32, the dummy pressure chambers 50*a* and 50*b*, and the connection route 52 are formed by through holes in the plates 11*a* to 11*c*. Namely, the supply channel 31, the return channel 32, the dummy pressure chambers 50*a* and 50*b*, and the connection route 52 have the same depth (the same length in the vertical direction), and the upper surfaces thereof are the same height and the lower surfaces thereof are the same height. Thus, the height of the upper and lower surfaces of a channel ranging from the supply channel 31 to the return channel 32 via the dummy pressure chambers 50*a* and 50*b* and the connection route 52 is constant, namely, does not vary.

As depicted in FIG. 3, the pressure chambers 20 are formed by the through holes in the plate 11*a*. The horizontal portions 25*a* of the coupling channels 25 are formed by the through holes in the plate 11*c*. The vertical portions 25*b* of the coupling channels 25 are formed by the through holes in the plate 11*b*. The connection channels 23 are formed by the through holes in the plate 11*b*. The communicating route 22 is formed by the through hole in the plate 11*c*. The nozzle 21 is formed by the through hole in the lowermost plate 11*d* of the four plates 11*a* to 11*d*. The nozzle 21 is opened in a lower surface of the channel substrate 11.

The actuator substrate 12 includes a vibration plate 12*a*, a common electrode 12*b*, piezoelectric bodies 12*c*, and individual electrodes 12*d* in that order from the bottom.

The vibration plate 12*a* and the common electrode 12*b* are disposed on a substantially entire portion of the upper surface of the channel substrate 11. The vibration plate 12*a* and the common electrode 12*b* cover all the pressure chambers 20, the supply channel 31, the return channel 32, the dummy pressure chambers 50*a* and 50*b*, and the connection route 52 formed in the channel substrate 11. The piezoelectric bodies 12*c* and the individual electrodes 12*d* are provided for the respective pressure chambers 20. The piezoelectric body 12*c* and the individual electrode 12*d* are stacked on top of each other at a position overlapping in the vertical direction with the pressure chamber 20.

The actuator substrate 12 further includes an insulating film 12*i* and individual traces 12*e*.

The insulating film 12*i* is made using silicon dioxide ($SiO_2$) or the like. The insulating film 12*i* covers parts of the upper surface of the common electrode 12*b* where the piezoelectric bodies 12*c* are not provided, side surfaces of the piezoelectric bodies 12*c*, and upper surfaces of the individual electrodes 12*d*. Parts of the insulating film 12*i* overlapping in the vertical direction with the individual electrodes 12*d* are formed having through holes.

The individual traces 12*e* are formed on the insulating film 12*i*. Specifically, the individual traces 12*e* are electrically connected to the respective individual electrodes 12*d* by allowing front ends of the individual traces 12*e* to pass through the through holes of the insulating film 12*i*. The individual traces 12*e* extend in the second direction to an end in the second direction of the actuator substrate 12.

A first end of the trace substrate 90 is fixed to an upper surface of the end in the second direction of the actuator substrate 12. A second end of the trace substrate 90 is connected to the controller 5. The driver IC 1*d* is provided between the first end and the second end of the trace substrate 90.

The trace substrate 90 is made using a Chip On Film (COF) or the like. The trace substrate 90 includes a common trace (not depicted) and individual traces 90*e* that are electrically connected to the respective individual traces 12*e*. The common trace is electrically connected to the common electrode 12*b* via the through hole of the insulating film 12*i*.

The driver IC 1*d* is electrically connected to the respective individual electrodes 12*d* via the individual traces 90*e*. The driver IC 1*d* is electrically connected to the common electrode 12*b* via the common trace. The driver IC 1*d* maintains the electrical potential of the common electrode 12*b* at a ground potential, and changes an electrical potential of the individual electrode 12*d*. Specifically, the driver IC 1*d* generates a driving signal based on a control signal from the controller 5, and applies the driving signal to the individual electrode 12*d*. This changes the electrical potential of the individual electrode 12*d* between a predefined driving potential and the ground potential. The change in electrical potential of the individual electrode 12*d* deforms part (actuator 12*x*) of the vibration plate 12*a* and the piezoelectric body 12*c* interposed between the individual electrode 12*d* and the pressure chamber 20 so that the actuator 12*x* becomes convex toward the pressure chamber 20. This changes the volume of the pressure chamber 20, applies pressure to the ink in the pressure chamber 20, and thereby discharges ink from the nozzle 21. The actuator substrate 12 includes multiple actuators 12*x* at positions overlapping in the vertical direction with the respective pressure chambers 20.

The piezoelectric bodies 12*c* the individual electrodes 12*d* are provided not only for the pressure chambers 20 but also for the dummy pressure chambers 20*x*, 50*a*, and 50*b* (see FIG. 2). Specifically, the piezoelectric bodies 12*c* and the individual electrodes 12*d* are stacked on top of each other (see FIG. 4) at positions overlapping in the vertical direction with the dummy pressure chambers 20*x*, 50*a*, and 50*b*. Namely, the actuator substrate 12 includes the actuators 12*x* at positions overlapping in the vertical direction with the respective dummy pressure chambers 20*x*, 50*a*, and 50*b*. Although the individual traces 12*e* are connected to the individual electrodes 12*d* provided for the dummy pressure chambers 20*x*, 50*a*, and 50*b*, the individual traces 12*e* are not electrically connected to the trace substrate 90. Thus, the electrical potential of the individual electrodes 12*d* provided for the dummy pressure chambers 20*x*, 50*a*, and 50*b* does not change as described above, and the volume of the dummy pressure chambers 20*x*, 50*a*, and 50*b* does not change as described above.

The piezoelectric bodies 12*c* provided for the dummy pressure chambers 50*a* and 50*b* correspond to a plurality of dummy piezoelectric bodies of the present disclosure. The individual electrodes 12*d* and the common electrode 12*b* provided for the dummy pressure chambers 50*a* and 50*b* correspond to a plurality of dummy electrodes of the present disclosure.

In the above channel configuration, when ink circulates between the subtank 7 and the channel substrate 11, ink flows through the channel substrate 11, as follows. Thick arrows in FIGS. 2 to 4 indicate the flowing of ink during the circulation.

When the controller 5 controls and drives a circulation pump 7*p*, the ink in the storage chamber 7*a* is supplied from the supply opening 31*x* to the supply channel 31. The ink supplied to the supply channel 31 flows through the supply channel 31 from the second side (the bottom of FIG. 2) to the first side (the top of FIG. 2) in the first direction, and then enters the individual channels 31 and the dummy individual channels 30*x*.

As depicted in FIG. 3, the ink flowing in each individual channel 30 passes through the coupling channel 25 corresponding to the first pressure chamber group 20A, flows into the pressure chamber 20 belonging to the first pressure chamber group 20A, passes through the connection channel 23 corresponding to the first pressure chamber group 20A to move downward, and flows into a first end of the communicating route 22. The ink flowing into the first end of the communicating route 22 passes through the communicating route 22 in the horizontal direction. Part of the ink passing through the communicating route 22 is discharged from the nozzle 21, and remaining part thereof flows, through a second end of the communicating route 22, into the connection channel 23 corresponding to the second pressure chamber group 20B to move upward. Then, ink flows into the pressure chamber 20 belonging to the second pressure chamber group 20B, passes through the coupling channel 25 corresponding to the second pressure chamber group 20B, and flows into the return channel 32.

The ink flowing into the dummy individual channels 30*x* flows similarly to the ink flowing into the individual channels 30. Since the dummy individual channels 30*x* include no nozzle 21, all the ink passing through the dummy individual channels 30*x* flows into the return channel 32.

The ink passing through the supply channel 31 and reaching the end at the first side in the first direction (the top of FIG. 2) of the supply channel 31 flows into the dummy pressure chamber 50*a* along the guide surface 31*g*. As depicted in FIG. 4, the ink flowing into the dummy pressure chamber 50*a* passes through the connection route 52 and the dummy pressure chamber 50*b*, and flows out of the dummy pressure chamber 50*b*. As depicted in FIG. 2, the ink flowing out of the dummy pressure chamber 50*b* flows into the end at the first side in the first direction (the top of FIG. 2) of the return channel 32 along the guide surface 32*g*.

The ink flowing into the end at the first side in the first direction (the top of FIG. 2) of the return channel 32 flows through the return channel 32 from the first side (the top of FIG. 2) to the second side (the bottom of FIG. 2) in the first direction, and then flows into the return opening 32*x* along the return guide surface 32*h*. The ink flowing into the return opening 32*x* returns to the storage chamber 7*a*.

The ink circulation between the subtank 7 and the channel substrate 11 removes bubbles in the channels in the channel substrate 11 and inhibits the increase in viscosity of ink. When ink contains a settling component (a component that may settle, such as pigment), the component is agitated or stirred to inhibit the settling.

As described above, the head 1 of this embodiment includes the two pressure chamber groups 20A and 20B formed by the pressure chambers 20 aligned in the first direction, and the two common channels (supply channel 31 and return channel 32) provided for the respective two pressure chamber groups 20A and 20B. The supply channel 31 and the return channel 32 communicate with each other via the dummy pressure chambers 50*a* and 50*b* arranged at the first side in the first direction relative to the pressure chamber groups 20A and 20B (see FIG. 2). In other words, instead of providing a connection channel connecting the supply channel 31 and the return channel 32 at the first side in the first direction relative to the pressure chamber groups 20A and 20B, the two common channels (supply channel 31 and return channel 32) communicate with each other by use of the dummy pressure chambers 50*a* and 50*b* that are provided to inhibit crosstalk and improve shaping accuracy.

This results in the ink circulation between the two common channels without enlarging a dimension in the first direction of the head 1.

The dummy pressure chambers 50*a* and 50*b* are larger in volume than the pressure chambers 20 (FIGS. 2 to 4). In that configuration, the ink circulation amount via the dummy pressure chambers 50*a* and 50*b* can be increased by decreasing the channel resistance of the dummy pressure chambers 50*a* and 50*b*.

The length in the third direction of the dummy pressure chambers 50*a* and 50*b* is longer than that of the pressure chambers 20 (see FIGS. 3 and 4). In that configuration, the ink circulation amount can be increased by decreasing the channel resistance of the dummy pressure chambers 50*a* and 50*b* without enlarging dimensions in the first and second directions of the head 1.

The dummy pressure chambers 20*x* having the same dimension as the pressure chambers 20 are provided between the dummy pressure chamber 50*a* and the first pressure chamber group 20A in the first direction and between the dummy pressure chamber 50*b* and the second pressure chamber group 20B in the first direction so that the dummy pressure chambers 20*x* are arranged in the first direction at the same pitch as the pressure chambers 20 (see FIG. 2). The effects of inhibiting crosstalk and improving shaping accuracy due to the dummy pressure chambers are further enhanced as the configuration (dimension and pitch) of the dummy pressure chambers is more similar to the configuration of the pressure chambers. The configuration of the first embodiment allows the dummy pressure chambers 50*a* and 50*b* having a large volume to increase the ink circulation amount as well as allows the dummy pressure chambers 20*x* to inhibit crosstalk and improve shaping accuracy.

The connection route 52 is at the same position as the dummy pressure chambers 50*a* and 50*b* in the third direction (see FIG. 4). The connection route 52 has the same length as the dummy pressure chambers 50*a* and 50*b* in the first direction (see FIG. 2). When the position in the third direction of the connection route 52 is different from that of the dummy pressure chambers 50*a* and 50*b*, and when the length in the first direction of the connection route 52 is shorter than that of the dummy pressure chambers 50*a* and 50*b*, ink does not flow smoothly via the dummy pressure chambers 50*a* and 50*b*. This may reduce the ink circulation amount. In the configuration of this embodiment, however, ink flows smoothly via the dummy pressure chambers 50*a* and 50*b*, thus increasing the ink circulation amount.

The supply opening 31*x* and the return opening 32*x* are provided at ends on the second side in the first direction (the bottom of FIG. 2) of the supply channel 31 and the return channel 32 (i.e., ends opposite to the ends where the supply channel 31 and the return channel 32 communicate with each other via the dummy pressure chambers 50*a* and 50*b*). The ends of the supply channel 31 and the return channel 32 opposite to the ends having the supply opening 31*x* and the return opening 32*x* have a slower flow rate of ink than the ends having the supply opening 31*x* and the return opening 32*x*, which may be likely to cause the stagnation of ink. In this embodiment, ink circulates at the ends opposite to the ends formed having the supply channel 31 and the return channel 32 via the dummy pressure chambers 50*a* and 50*b*, thus inhibiting the stagnation of ink.

The ends at the first side in the first direction (the top of FIG. 2) of the supply channel 31 and the return channel 32 are defined by the guide surfaces 31*g* and 32*g*. As described above, the ends at the first side in the first direction (the top of FIG. 2) of the supply channel 31 and the return channel 32 are provided opposite to the ends formed having the supply opening 31*x* and the return opening 32*x*. This makes the ink flow rate slow, which may be likely to cause the stagnation of ink. In this embodiment, however, the guide surfaces 31*g* and 32*g* are provided at the ends opposite to the ends formed having the supply opening 31*x* and the return opening 32*x*, thus inhibiting the stagnation of ink.

The guide surface 31*g* does not overlap in the second direction with any of the pressure chambers 20 composing the first pressure chamber group 20A. The guide surface 32*g* does not overlap in the second direction with any of the pressure chambers 20 composing the second pressure chamber group 20B (see FIG. 2). When the guide surfaces 31*g* and 32*g* overlap in the second direction with certain pressure chamber(s) 20, the flow rate of ink in the certain pressure chamber(s) 20 increases. This may make the ink discharge performance of the nozzle(s) 21 communicating with the certain pressure chamber(s) 20 different from that of the nozzle(s) 21 communicating with remaining pressure chamber(s) 20. Further, the channel resistance of the certain pressure chamber(s) 20 increases, which may cause an under-refilling phenomenon. In the configuration of this embodiment, however, the guide surfaces 31*g* and 32*g* do not overlap in the second direction with any of the pressure chambers 20, thus inhibiting the above problem.

The end at the second side in the first direction (the bottom of FIG. 2) of the return channel 32 is defined by the return guide surface 32*h*. This configuration inhibits the stagnation of ink in the vicinity of the return opening 32*x*.

The return guide surface 32*h* does not overlap in the second direction with any of the pressure chambers 20 belonging to the second pressure chamber group 20B (see FIG. 2). When the return guide surface 32*h* overlaps in the second direction with certain pressure chamber(s) 20, the flow rate of ink in the certain pressure chamber(s) 20 increases. This may make the ink discharge performance of the nozzle(s) 21 communicating with the certain pressure chamber(s) 20 different from that of the nozzle(s) 21 communicating with remaining pressure chamber(s) 20. Further, the channel resistance of the certain pressure chamber(s) 20 increases, which may cause an under-refilling phenomenon. In the configuration of this embodiment, however, the return guide surface 32*h* does not overlap in the second direction with any of the pressure chambers 20, thus inhibiting the above problem.

The pressure chamber 20 belonging to the first pressure chamber group 20A communicates with the pressure chamber 20 belonging to the second pressure chamber group 20B via the connection channels 23 and the communicating route 22 passing immediately above the nozzle 21 (see FIG. 3). In that configuration, the ink circulation via the connection channels 23 and the communicating route 22 inhibits the nozzle 21 from drying, thereby maintaining the meniscus.

The dummy piezoelectric bodies 12*c* are provided at positions overlapping in the third direction with the dummy pressure chambers 50*a* and 50*b* (see FIG. 4). In that configuration, the difference in contraction amount due to baking of the piezoelectric bodies 12*c* is inhibited between the pressure chambers 20 belonging to the respective pressure chamber groups 20A and 20B and positioned at a center portion in the first direction and the pressure chambers 20 belonging to the respective pressure chamber groups 20A and 20B and positioned at the ends in the first direction, and thus the shaping accuracy is improved.

Dummy electrodes (the individual electrodes 12*d* and the common electrode 12*b* provided for the dummy pressure chambers 50*a* and 50*b*) are provided at the first and second sides in the third direction relative to the dummy piezoelectric bodies 12*c* (see FIG. 4). In that configuration, not only the difference in contraction amount due to baking of the piezoelectric bodies 12*c* but also the difference in contraction amount due to the formation of the electrodes are inhibited between the pressure chambers 20 belonging to the respective pressure chamber groups 20A and 20B and positioned at the center portion in the first direction and the pressure chambers 20 belonging to the respective pressure chamber groups 20A and 20B and positioned at the ends in the first direction, and thus the shaping accuracy is further improved. The dummy electrodes are not electrically connected to the trace substrate 90, thus inhibiting the dummy piezoelectric bodies 12*c* from being driven needlessly.

The dummy pressure chambers 50*a* and 50*b* communicate with no nozzle 21 (see, FIGS. 2 and 4). When the dummy pressure chambers 50*a* and 50*b* communicate with the nozzle(s) 21, the volume of the dummy pressure chambers 50*a* and 50*b* varies depending on the change in volume of the pressure chamber(s) 20 adjacent to the dummy pressure chambers 50*a* and 50*b*. This may cause the leakage of ink from the nozzle(s) 21. The configuration of this embodiment, however, inhibits this problem.

Second Embodiment

Figure 6:
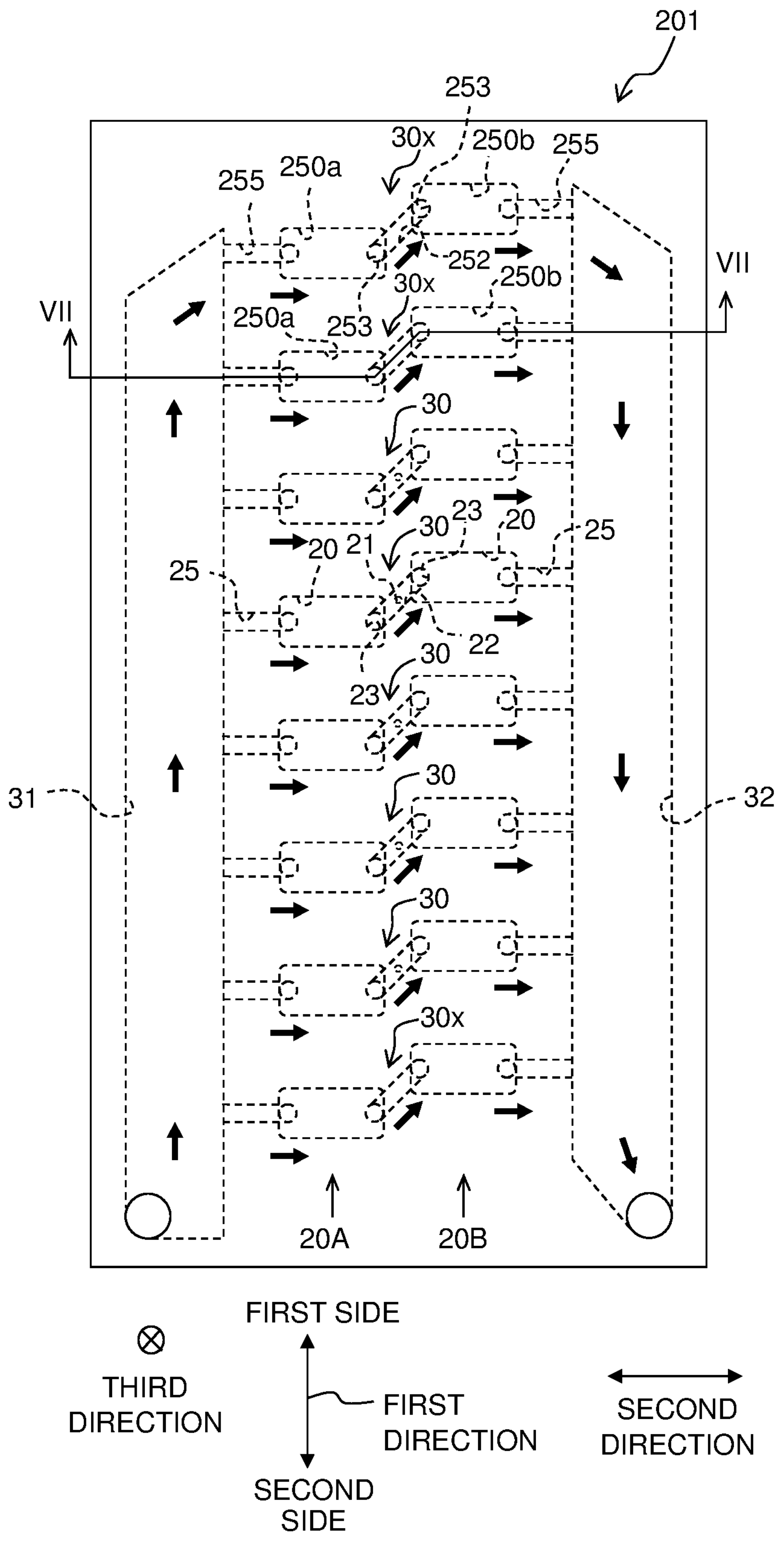
FIG. 6 is a plan view of a head according to the second embodiment of the present disclosure.
Figure 7:
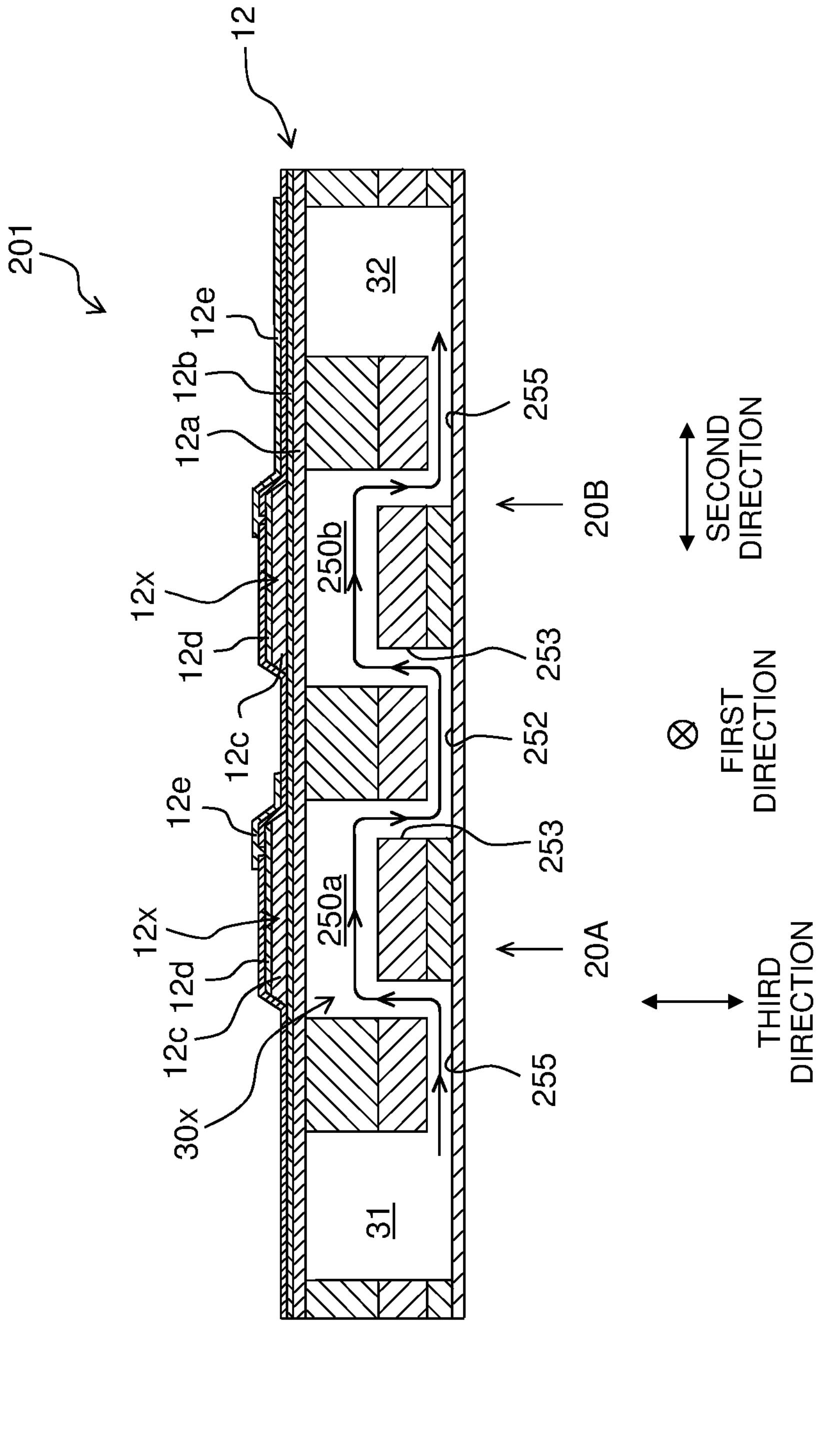
FIG. 7 is a cross-sectional view of the head taken along a line VII-III in FIG. 6.

Referring to FIGS. 6 and 7, a head 201 according to the second embodiment of the present disclosure is explained.

In the first embodiment, the supply channel 31 communicates with the return channel 32 (see, FIGS. 2 and 4) via the dummy pressure chambers 50*a* and 50*b* that are larger than the pressure chambers 20. In the second embodiment, the supply channel 31 communicates with the return channel 32 (see, FIGS. 6 and 7) via dummy pressure chambers 250*a* and 250*b* having the same dimension as the pressure chambers 20.

In the following, configurations of the second embodiment different from the first embodiment are explained, and explanation for configurations of the second embodiment that are the same as those of the first embodiment is omitted.

In this embodiment, two dummy individual channels 30*x* are arranged at the first side in the first direction (the top of FIG. 6) relative to the individual channels 30. Similar to the dummy individual channels 30*x* of the first embodiment, the dummy individual channels 30*x* have the same configuration as the individual channels 30 except that the dummy individual channels 30*x* include no nozzle 21.

One of two dummy pressure chambers included in each dummy individual channel 30*x* and disposed at the first side in the first direction (the top of FIG. 6) relative to the pressure chambers 20 belonging to the first pressure chamber group 20A is a dummy pressure chamber 250*a*. The other of the two dummy pressure chambers included in each dummy individual channel 30*x* and disposed at the first side in the first direction (the top of FIG. 6) relative to the pressure chambers 20 belonging to the second pressure chamber group 20B is a dummy pressure chamber 250*b*.

Namely, two dummy pressure chambers 250*a* are arranged at the first side in the first direction (the top of FIG. 6) relative to the pressure chambers 20 belonging to the first pressure chamber group 20A. Two dummy pressure chambers 250*b* are arranged at the first side in the first direction (the top of FIG. 6) relative to the pressure chambers 20 belonging to the second pressure chamber group 20B.

Here, the dummy pressure chambers 250*a* correspond to the first dummy pressure chamber of the present disclosure, and the dummy pressure chambers 250*b* correspond to the second dummy pressure chamber of the present disclosure.

The supply channel 31 communicates with the return channel 32 via the two dummy pressure chambers 250*a* and the two dummy pressure chambers 250*b*.

The dummy pressure chambers 250*a* and 250*b* have the same dimension as the pressure chambers 20. The dummy pressure chambers 250*a* and 250*b* are arranged in the first direction at the same pitch as the pressure chambers 20 belonging to the pressure chamber groups 20A and 20B. The dummy pressure chambers 250*a* and 250*b* are at the same position as the pressure chambers 20 in the third direction (see, FIG. 7).

Coupling channels 255, which are similar to the coupling channels 25, are coupled to first ends in the second direction of the dummy pressure chambers 250*a* and 250*b*. Connection channels 253, which are similar to the connection channels 23, are coupled to second ends in the second direction of the dummy pressure chambers 250*a* and 250*b*. Lower ends of the two connection channels 253 are connected to each other via a communicating route 252 that is similar to the communicating route 22.

As depicted in FIG. 7, the dummy pressure chambers 250*a* and 250*b* are covered with the vibration plate 12*a* and the common electrode 12*b* of the actuator substrate 12. The piezoelectric bodies 12*c* and the individual electrodes 12*d* are provided not only for the pressure chambers 20 but also for the dummy pressure chambers 250*a* and 250*b*. The actuator substrate 12 includes the actuators 12*x* also at positions overlapping in the vertical direction with the dummy pressure chambers 250*a* and 250*b*. Although the individual traces 12*e* are connected also to the individual electrodes 12*d* provided for the dummy pressure chambers 250*a* and 250*b*, the individual traces 12*e* are not electrically connected to the trace substrate 90 (see FIG. 3). Thus, the electrical potential of the individual electrodes 12*d* provided for the dummy pressure chambers 250*a* and 250*b* is not changed as described above, and the volume of the dummy pressure chambers 250*a* and 250*b* is not changed as described above.

Here, the piezoelectric bodies 12*c* provided for the dummy pressure chambers 250*a* and 250*b* correspond to the plurality of dummy piezoelectric bodies of the present disclosure. The individual electrodes 12*d* and the common electrode 12*b* provided for the dummy pressure chambers 250*a* and 250*b* correspond to the plurality of dummy electrodes of the present disclosure.

When ink circulates through the channel configuration of the second embodiment, ink flows as follows. Thick arrows in FIGS. 6 and 7 indicate the flowing of ink during the circulation.

The ink supplied to the supply channel 31 flows through the supply channel 31 from the second side (the bottom of FIG. 6) to the first side (the top of FIG. 6) in the first direction, and then flows into the individual channels 30 and the dummy individual channels 30*x*.

The ink flowing into the dummy individual channels 30*x* flows similarly to the ink flowing into the individual channels 30. However, the dummy individual channels 30*x* include no nozzle 21, and thus all the ink passing through the dummy individual channels 30*x* flows into the return channel 32.

Specifically, as depicted in FIG. 7, the ink flowing into the dummy individual channel 30*x* flows through the coupling channel 255 corresponding to the first pressure chamber group 20A, flows into the dummy pressure chamber 250*a*, passes through the connection channel 253 corresponding to the pressure chamber group 20A to move downward, and flows into a first end of the communicating route 252. The ink flowing into the first end of the communicating route 252 passes through the communicating route 252 in the horizontal direction, flows into the connection channel 253 corresponding to the second pressure chamber group 20B through a second end of the communicating route 252 to move upward. The ink moving upward flows into the dummy pressure chamber 250*b*, passes through the coupling channel 255 corresponding to the second pressure chamber group 20B, and flows into the return channel 32.

The flowing of ink via the dummy individual channels 30*x* is generated at the ends at the first side in the first direction (the top of FIG. 6) of the supply channel 31 and the return channel 32.

As described above, the following effects can be obtained in the second embodiment in addition to the effects obtained from the configurations similar to the first embodiment.

As the dummy pressure chambers that allow the supply channel 31 to communicate with the return channel 32, the dummy pressure chambers 250*a* and 250*b* having the same dimension and pitch as the pressure chambers 20 are used (see FIG. 6). This configuration provides better effects of inhibiting crosstalk and improving shaping accuracy than a case in which the dimension and pitch of the dummy pressure chambers are different from those of the pressure chambers.

The dummy pressure chambers 250*a* and 250*b* are at the same position in the third direction as the pressure chambers 20 (see FIG. 7). This configuration reliably provides the effects of inhibiting crosstalk and improving shaping accuracy.

Third Embodiment

Figure 8:
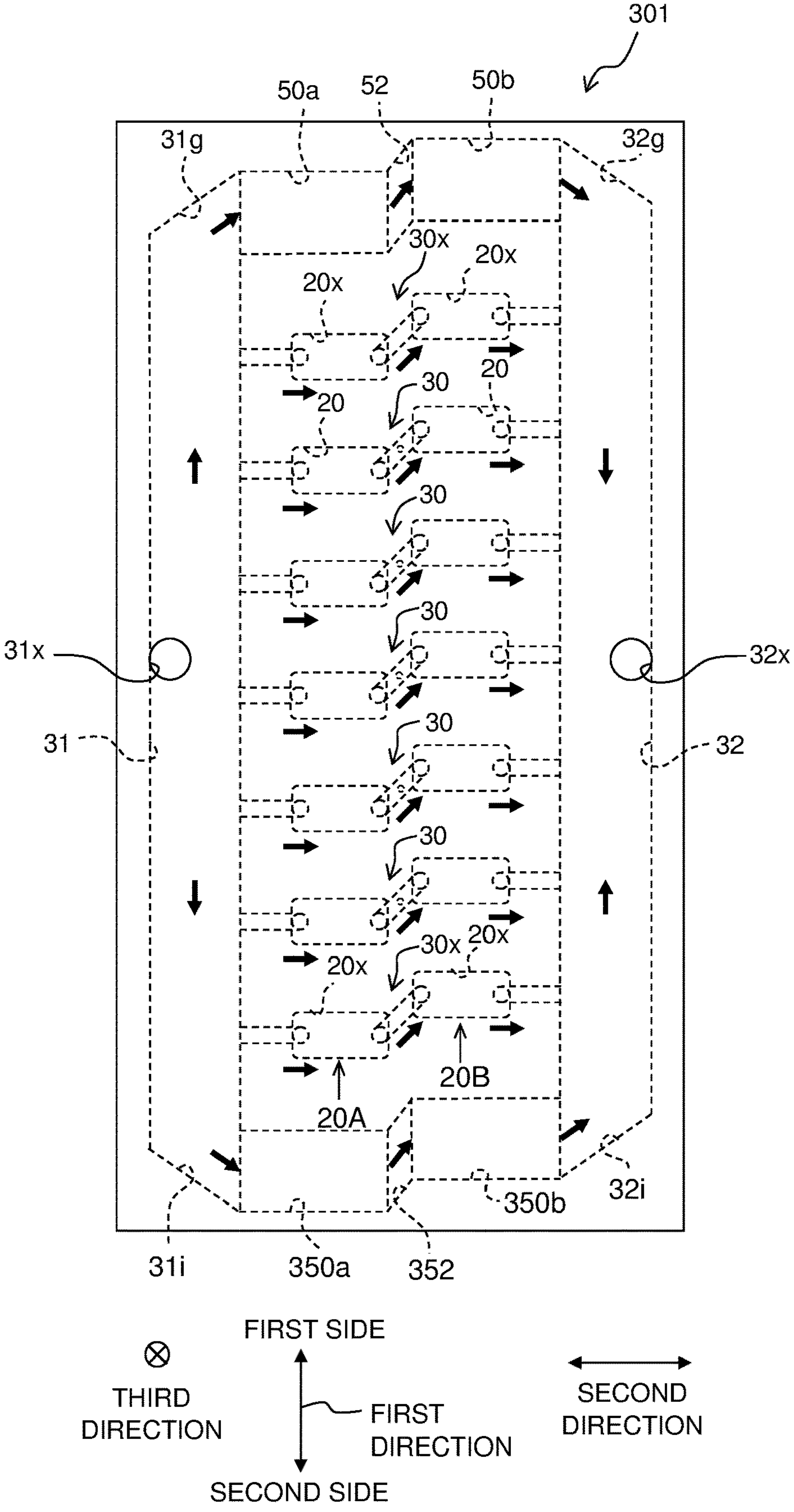
FIG. 8 is a plan view of a head according to the third embodiment of the present disclosure.

Referring to FIG. 8, a head 301 of the third embodiment of the present disclosure is explained below.

In the first embodiment, the supply channel 31 communicates with the return channel 32 via the dummy pressure chambers 50*a* and 50*b* only at the first side in the first direction (the top of FIG. 2) relative to the individual channels 30. In the third embodiment, the supply channel 31 communicates with the return channel 32 via the dummy pressure chambers 50*a*, 50*b*, 350*a*, and 350*b* at the first side (the top of FIG. 8) and the second side (the bottom of FIG. 8) in the first direction relative to the individual channels 30.

In the following, configurations of the third embodiment different from the first embodiment are explained, and explanation for configurations of the third embodiment that are the same as those of the first embodiment is omitted.

In the third embodiment, the dummy pressure chambers 50*a* and 50*b* similar to those of the first embodiment are disposed at the first side in the first direction (the top of FIG. 8) relative to the individual channels 30. Further, the dummy pressure chambers 350*a* and 350*b* similar to the dummy pressure chambers 50*a* and 50*b* are disposed at the second side in the first direction (the bottom of FIG. 8) relative to the individual channels 30. The dummy pressure chamber 350*a* communicates with the dummy pressure chamber 350*b* via a connection route 352 similar to the connection route 52.

The dummy pressure chambers 350*a* and 350*b* are disposed at the second side in the first direction (the bottom of FIG. 8) relative to the individual channels 30 with one dummy individual channel 30*x* interposed therebetween.

The dummy pressure chamber 350*a* is disposed at the second side in the first direction (the bottom of FIG. 8) relative to the pressure chambers 20 belonging to the first pressure chamber group 20A. One dummy pressure chamber 20*x* is disposed between the dummy pressure chamber 350*a* and the pressure chambers 20 belonging to the first pressure chamber group 20A in the first direction. The dummy pressure chamber 350*a*, the pressure chambers 20 belonging to the first pressure chamber group 20A, the dummy pressure chambers 20*x* corresponding to the first pressure chamber group 20A, and the dummy pressure chamber 50*a* are aligned in the first direction.

The dummy pressure chamber 350*b* is disposed at the second side in the first direction (the bottom of FIG. 8) relative to the pressure chambers 20 belonging to the second pressure chamber group 20B. One dummy pressure chamber 20X is disposed between the dummy pressure chamber 350*b* and the pressure chambers 20 belonging to the second pressure chamber group 20B in the first direction. The dummy pressure chamber 350*b*, the pressure chambers 20 belonging to the second pressure chamber group 20B, the dummy pressure chambers 20*x* corresponding to the second pressure chamber group 20B, and the dummy pressure chamber 50*b* are aligned in the first direction.

The dummy pressure chamber 50*a* corresponds to the first dummy pressure chamber of the present disclosure, the dummy pressure chamber 50*b* corresponds to the second dummy pressure chamber of the present disclosure, the dummy pressure chamber 350*a* corresponds to a third dummy pressure chamber of the present disclosure, and the dummy pressure chamber 350*b* corresponds to a fourth dummy pressure chamber of the present disclosure.

The supply opening 31*x* is formed at a substantially center portion in the first direction of the supply channel 31. The return opening 32*x* is formed at a substantially center portion in the first direction of the return channel 32.

Similar to the first embodiment, the end at the first side in the first direction (the top of FIG. 8) of the supply channel 31 is defined by the guide surface 31*g*. The end at the first side in the first direction (the top of FIG. 8) of the return channel 32 is defined by the guide surface 32*g*.

In the third embodiment, an end at the second side in the first direction (the bottom of FIG. 8) of the supply channel 31 is defined by a guide surface 31*i*. An end at the second side in the first direction (the bottom of FIG. 8) of the return channel 32 is defined by a guide surface 32*i*.

The guide surface 31*g* corresponds to a first guide surface of the present disclosure, the guide surface 32*g* corresponds to a second guide surface of the present disclosure, the guide surface 31*i* corresponds to a third guide surface of the present disclosure, and the guide surface 32*i* corresponds to a fourth guide surface of the present disclosure.

Each of the guide surfaces 31*i* and 32*i* extends in an oblique direction (a direction orthogonal to the third direction and intersecting with the first direction and the second direction). The guide surfaces 31*i* and 32*i* are arranged symmetrically with respect to a virtual straight line extending in the first direction. Specifically, the guide surface 31*i* is inclined to the first direction so that a portion closer to the second side in the first direction (the bottom of FIG. 8) is closer in the second direction to the return channel 32 than a portion closer to the first side in the first direction (the top of FIG. 8). The guide surface 32*i* is inclined to the first direction so that a portion closer to the second side in the first direction (the bottom of FIG. 8) is closer in the second direction to the supply channel 31 than a portion closer to the first side in the first direction (the top of FIG. 8).

The guide surface 31*i* does not overlap in the second direction with any of the pressure chambers 20 belonging to the first pressure chamber group 20A, and overlaps in the second direction with the dummy pressure chamber 350*a*. The guide surface 32*i* does not overlap in the second direction with any of the pressure chambers 20 belonging to the second pressure chamber group 20B, and overlaps in the second direction with the dummy pressure chamber 350*b*.

When ink circulates through the channel configuration of the third embodiment, ink flows as follows. Thick arrows in FIG. 8 indicate the flowing of ink during the circulation.

The ink supplied to the supply channel 31 flows into the individual channels 30 and the dummy individual channels 30*x* while flowing through the supply channel 31 from the supply opening 31*x* toward both the first side (the top of FIG. 8) and the second side (the bottom of FIG. 8) in the first direction.

The ink flowing through the supply channel 31 and reaching the end at the first side in the first direction (the top of FIG. 8) of the supply channel 31 flows into the dummy pressure chamber 50*a* along the guide surface 31*g*. The ink flowing into the dummy pressure chamber 50*a* passes through the connection route 52 and the dummy pressure chamber 50*b*, and flows out of the dummy pressure chamber 50*b*. The ink flowing out of the dummy pressure chamber 50*b* flows into the end at the first side in the first direction (the top of FIG. 8) of the return channel 32 along the guide surface 32*g*.

The ink flowing through the supply channel 31 and reaching the end at the second side in the first direction (the bottom of FIG. 8) of the supply channel 31 flows into the dummy pressure chamber 350*a* along the guide surface 31*i*. The ink flowing into the dummy pressure chamber 350*a* passes through the connection route 352 and the dummy pressure chamber 350*b*, and flows out of the dummy pressure chamber 350*b*. The ink flowing out of the dummy pressure chamber 350*b* flows into the end at the second side (the bottom of FIG. 8) in the first direction of the return channel 32 along the guide surface 32*i*.

The ink flowing into the end at the first side in the first direction (the top of FIG. 8) of the return channel 32 passes through the return channel 32 from the first side (the top of FIG. 8) to the second side (the bottom of FIG. 8) in the first direction, and flows into the return opening 32*x*.

The ink flowing into the end at the second side (the bottom of FIG. 8) in the first direction of the return channel 32 passes through the return channel 32 from the second side (the bottom of FIG. 8) to the first side (the top of FIG. 8) in the first direction, and flows into the return opening 32*x*.

As described above, the following effects can be obtained in the third embodiment in addition to the effects obtained from the configurations similar to the first embodiment.

The dummy pressure chambers 350*a* and 350*b* are provided for the respective pressure chamber groups 20A and 20B at the second side in the first direction (the bottom of FIG. 8), in addition to the dummy pressure chambers 50*a* and 50*b* provided for the respective pressure chamber groups 20A and 20B at the first side in the first direction (the top of FIG. 8). This inhibits crosstalk and improves shaping accuracy not only at the first side in the first direction but also at the second side in the first direction.

The supply channel 31 communicates with the return channel 32 not only via the dummy pressure chambers 50*a* and 50*b* at the first side in the first direction (the top of FIG. 8) relative to the respective pressure chamber groups 20A and 20B, but also via the dummy pressure chambers 350*a* and 350*b* at the second side in the first direction (the bottom of FIG. 8) relative to the respective pressure chamber groups 20A and 20B. This configuration reduces the pressure loss of the return channel 32 to increase the ink circulation amount compared to a case in which ink circulates only at the first side in the first direction.

The supply opening 31*x* is provided between the end at the first side in the first direction (the top of FIG. 8) and the end at the second side in the first direction (the bottom of FIG. 8) in the first direction of the supply channel 31, and the return opening 32*x* is provided between the end at the first side in the first direction (the top of FIG. 8) and the end at the second side in the first direction (the bottom of FIG. 8) in the first direction of the return channel 32. In that configuration, the resistance of the channel passing through the dummy pressure chambers 50*a* and 50*b* provided at the first side in the first direction (the top of FIG. 8) is identical to the resistance of the channel passing through the dummy pressure chambers 350*a* and 350*b* provided at the second side in the first direction (the bottom of FIG. 8). Ink thus circulates through the head 301 uniformly.

The ends at the first side in the first direction (the top of FIG. 8) of the supply channel 31 and the return channel 32 are defined by the guide surfaces 31*g* and 32*g*, respectively. The ends at the second side in the first direction (the bottom of FIG. 8) of the supply channel 31 and the return channel 32 are defined by the guide surfaces 31*i* and 32*i*, respectively. Portions away from the supply opening 31*x* and the return opening 32*x* may have a small flow rate of ink, which may easily cause the stagnation of ink. Such portions are formed having the guide surfaces 31*g*, 32*g*, 31*i*, and 32*i* in the third embodiment, thus inhibiting the stagnation of ink.

The guide surfaces 31*g* and 31*i* do not overlap in the second direction with any of the pressure chambers 20 belonging to the first pressure chamber group 20A. The guide surfaces 32*g* and 32*i* do not overlap in the second direction with any of the pressure chambers 20 belonging to the second pressure chamber group 20B. When the guide surfaces 31*g*, 32*g*, 31*i*, and 32*i* overlap in the second direction with certain pressure chamber(s) 20, the flow rate of ink in the certain pressure chamber(s) 20 increases. This may make the ink discharge performance of the nozzle(s) 21 communicating with the certain pressure chamber(s) 20 different from that of the nozzle(s) 21 communicating with remaining pressure chamber(s) 20. Further, the channel resistance of the certain pressure chamber(s) 20 increases, which may cause an under-refilling phenomenon. In the configuration of the third embodiment, however, the guide surfaces 31*g*, 32*g*, 31*i*, and 32*i* do not overlap in the second direction with any of the pressure chambers 20, thus inhibiting the above problem.

Fourth Embodiment

Figure 9:
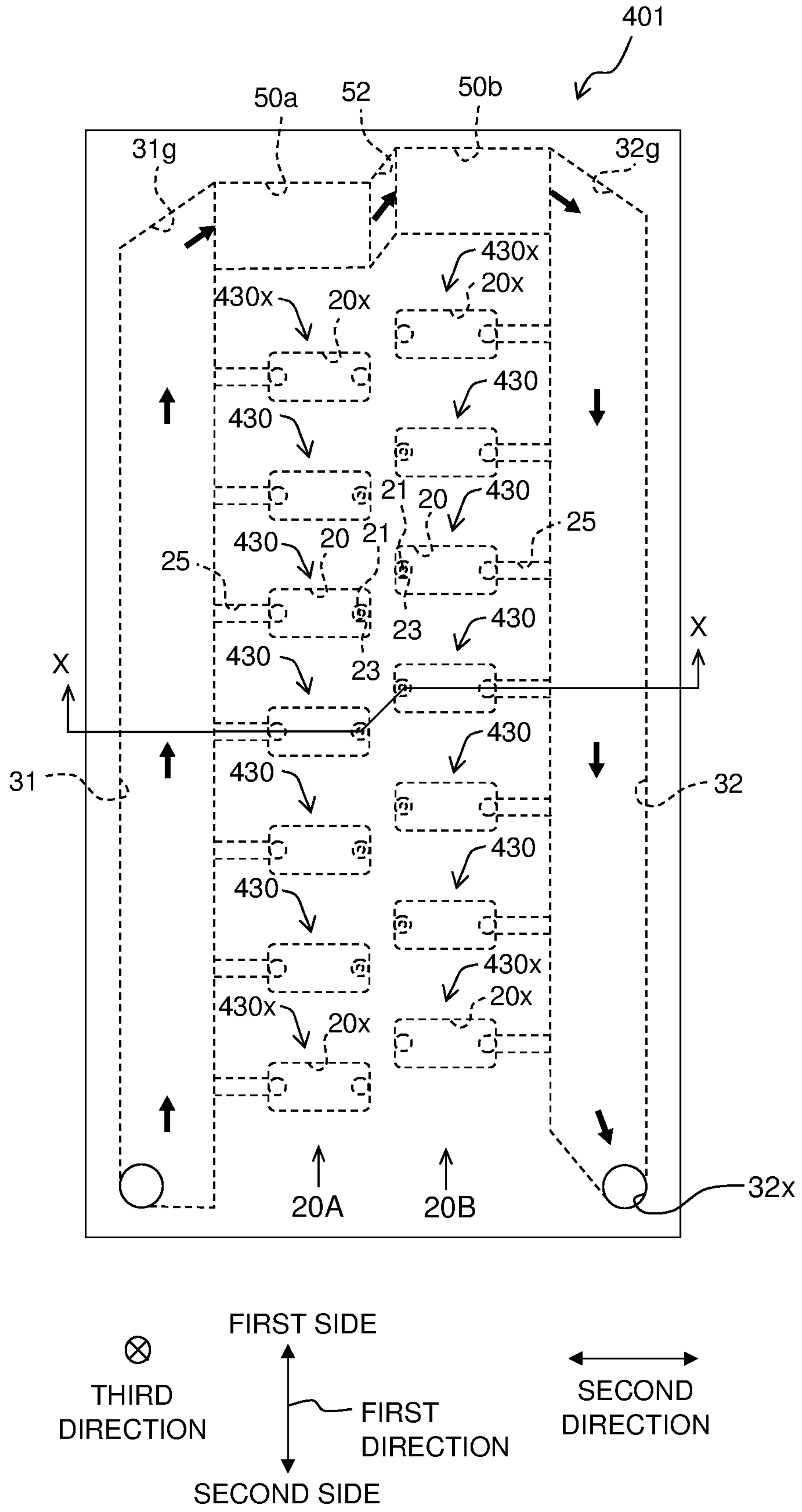
FIG. 9 is a plan view of a head according to the fourth embodiment of the present disclosure.
Figure 10:
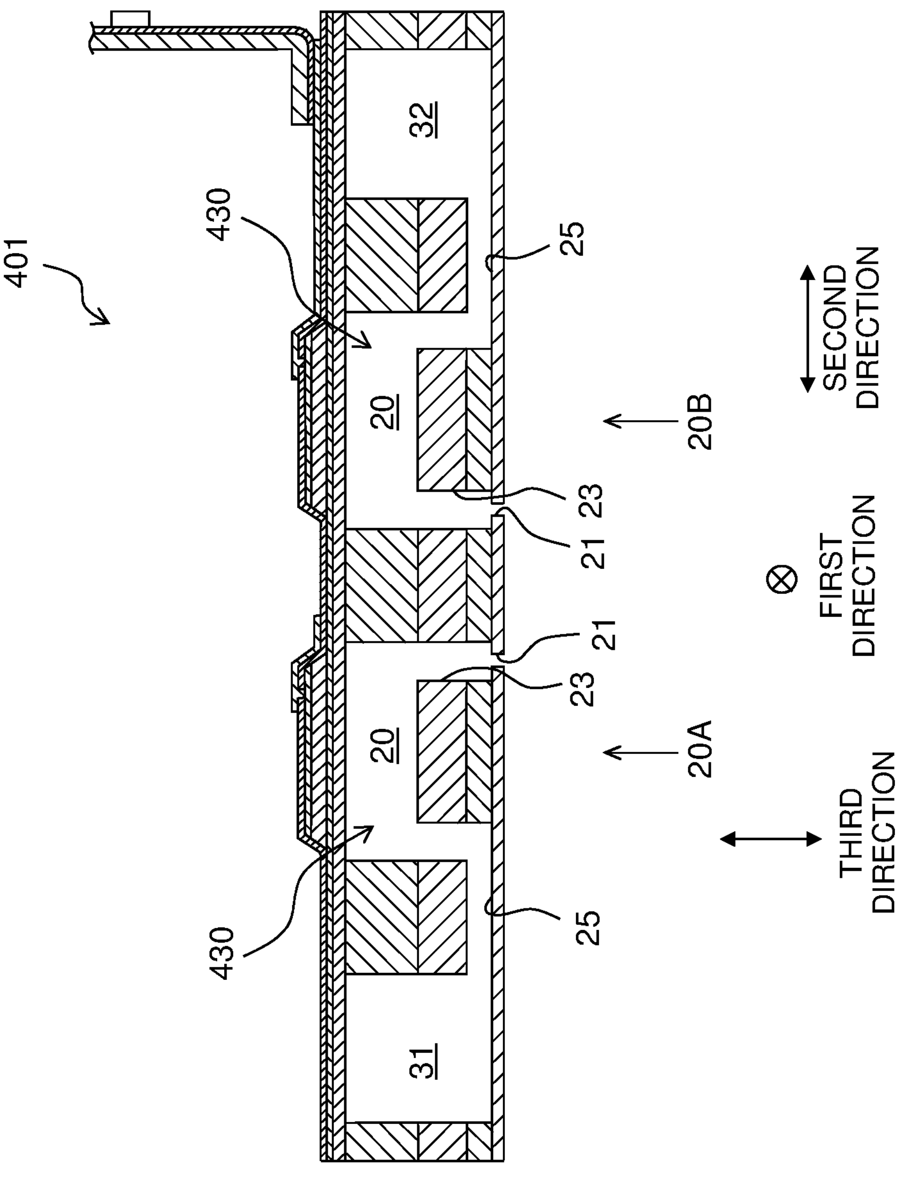
FIG. 10 is a cross-sectional view of the head taken along a line X-X in FIG. 9.

Referring to FIGS. 9 and 10, a head 401 of the fourth embodiment of the present disclosure is explained below.

In the first embodiment, the pressure chambers 20 belonging to the first pressure chamber group 20A communicate with the pressure chambers 20 belonging to the second pressure chamber group 20B via the coupling routes 22 (see, FIGS. 2 and 3). In the fourth embodiment, the pressure chambers 20 belonging to the first pressure chamber group 20A do not communicate with the pressure chambers 20 belonging to the second pressure chambers 20B via the coupling routes 22. The nozzles 21 are disposed immediately under the connection channels 23 (see, FIGS. 9 and 10).

In the following, configurations of the fourth embodiment different from the first embodiment are explained, and explanation for configurations of the fourth embodiment that are the same as those of the first embodiment is omitted.

In the fourth embodiment, individual channels 430 are arranged zigzag in the sheet width direction (first direction) to form two rows. The individual channels 430 are classified into those including pressure chambers 20 belonging to the first pressure chamber group 20A and those including pressure chambers 20 belonging to the second pressure chamber group 20B. Each individual channel 430 includes one pressure chamber 20, one nozzle 21, one connection channel 23, and one coupling channel 25. When pressure is applied to the ink in the pressure chamber 20 of each individual channel 430, the ink is discharged from the nozzle 21 via the connection channel 23.

Dummy individual channels 430*x* are respectively disposed at the first side (the top of FIG. 9) and the second side (the bottom of FIG. 9) in the first direction relative to the individual channels 430 including the pressure chambers 20 belonging to the first pressure chamber group 20A. Dummy individual channels 430*x* are respectively disposed at the first side (the top of FIG. 9) and the second side (the bottom of FIG. 9) in the first direction relative to the individual channels 430 including the pressure chambers 20 belonging to the second pressure chamber group 20B. The dummy individual channels 430*x* have the same configuration as the individual channels 430 except that the dummy individual channels 430*x* include no nozzle 21. Part of the dummy individual channel 430*x* corresponding to the pressure chamber 20 is the dummy pressure chamber 20*x*. The dummy pressure chamber 20*x* has the same dimension as the pressure chamber 20. The dummy pressure chambers 20*x* are arranged in the first direction at the same pitch as the pressure chambers 20 belonging to the pressure chamber groups 20A and 20B.

The dummy pressure chamber 50*a* is disposed at the first side in the first direction (the top of FIG. 9) relative to the individual channels 430 including the pressure chambers 20 belonging to the first pressure chamber group 20A, with one dummy individual channel 430*x* interposed therebetween. The dummy pressure chamber 50*b* is disposed at the first side in the first direction (the top of FIG. 9) relative to the individual channels 430 including the pressure chambers 20 belonging to the second pressure chamber group 20B, with one dummy individual channel 430*x* interposed therebetween.

When ink circulates through the channel configuration of the fourth embodiment, ink flows as follows. Thick arrows in FIG. 9 indicate the flowing of ink during the circulation.

The ink supplied to the supply channel 31 passes through the supply channel 31 from the second side (the bottom of FIG. 9) to the first side (the top of FIG. 9) in the first direction. In the fourth embodiment, ink does not flow from the supply channel 31 to the return channel 32 via the individual channels 430 and the dummy individual channels 430*x*.

The ink reaching the end at the first side in the first direction (the top of FIG. 9) of the supply channel 31 flows into the end at the first side (the top of FIG. 9) in the first direction of the return channel 32 via the dummy pressure chamber 50*a*, the connection route 52, and the dummy pressure chamber 50*b*. The ink flowing into the end at the first side in the first direction of the return channel 32 flows through the return channel 32 from the first side (the top of FIG. 9) to the second side (the bottom of FIG. 9) in the first direction, flows out of the return opening 32*x*, and then returns to the storage chamber 7*a* (see FIG. 2).

As described above, although the configuration of the individual channels of the fourth embodiment is different from that of the first embodiment, the effects similar to the first embodiment based on the configuration similar to the first embodiment can be obtained.

Modified Examples

The embodiments of the present disclosure are explained above. The present disclosure, however, is not limited to the above embodiments. Various changes or modifications in the design may be made without departing from the claims.

The second direction may not be orthogonal to the first direction as long as the second direction intersects with the first direction.

The guide surface(s) may be omitted.

In the above embodiments, each of the first pressure chamber group and the second pressure chamber group is formed from the pressure chambers that are arranged in a row. Each of the first pressure chamber group and the second pressure chamber group, however, may be formed from the pressure chambers that are arranged to form multiple rows.

The individual traces may not be provided for the individual electrodes (dummy electrodes) provided for the dummy pressure chambers. The dummy electrodes may not be provided for the dummy pressure chambers. The dummy piezoelectric bodies may not be provided for the dummy pressure chambers.

The dummy pressure chambers may communicate with the nozzles.

In the first embodiment, the planer dimension orthogonal to the third direction of the dummy pressure chambers 50*a* and 50*b* is larger than that of the pressure chambers 20, and the length in the third direction of the dummy pressure chambers 50*a* and 50*b* is longer than that of the pressure chambers 20. The present disclosure, however, is not limited thereto. For example, the planer dimension orthogonal to the third direction of the dummy pressure chambers may be the same as that of the pressure chambers, and the length in the third direction of the dummy pressure chambers may be longer than that of the pressure chambers. Or, the planer dimension orthogonal to the third direction of the dummy pressure chambers may be larger than that of the pressure chambers, and the length in the third direction of the dummy pressure chambers may be the same as that of the pressure chambers.

In the first embodiment, one dummy pressure chamber 20*x* is provided between the dummy pressure chamber 50*a* and the pressure chamber group 20A and between the dummy pressure chamber 50*b* and the pressure chamber group 20B. Multiple dummy pressure chambers 20*x*, however, may be provided between the dummy pressure chamber 50*a* and the pressure chamber group 20A and between the dummy pressure chamber 50*b* and the pressure chamber group 20B. For example, approximately three dummy pressure chambers 20*x* may be provided to inhibit crosstalk and improve shaping accuracy.

The dummy pressure chambers 20*x* (another dummy pressure chamber) may be omitted.

In the second embodiment, two dummy pressure chambers 250*a* and two dummy pressure chambers 250*b* are provided. In order to make the ink circulation amount sufficient, approximately 10 first dummy pressure chambers and approximately 10 second dummy pressure chambers may be provided.

The first common channel may communicate with the second common channel via the dummy pressure chambers having the same dimension as the pressure chambers at the first side and the second side in the first direction. For example, the dummy pressure chambers 250*a* and 250*b* of the second embodiment may be also disposed at the second side in the first direction (the bottom of FIG. 6) relative to the pressure chamber groups 20A and 20B.

In addition to the dummy pressure chambers, a channel (e.g., a channel having a depth equivalent to the common channel and not including the dummy piezoelectric bodies and the dummy electrodes) may be added to allow the first common channel and the second common channel to communicate with each other via the dummy pressure chambers and the channel. When compared to a configuration in which ink circulates only through the channel, the above configuration can reduce the ink circulation amount via the channel, because ink circulates also through the dummy pressure chambers. The width of the channel (the length in the first direction) is thus short in the above configuration, resulting in a small dimension in the first direction of the head.

In the first to third embodiments, one nozzle is provided for two pressure chambers.

One nozzle, however, may be provided for one pressure chamber. For example, the configuration of individual channels of the fourth embodiment may be applied to the second or third embodiment. In that case, ink flows from the first common channel to the second common channel via the first dummy pressure chamber and the second dummy pressure chamber during the circulation, but ink does not flow from the first common channel to the second common channel via the individual channels during the circulation.

Namely, the present disclosure is applicable to a case in which the pressure chambers belonging to the first pressure chamber group communicate with the pressure chambers belonging to the second pressure chamber group and to a case in which the pressure chambers belonging to the first pressure chamber group do not communicate with the pressure chambers belonging to the second pressure chamber group.

The actuator is not limited to a piezo-type actuator using piezoelectric elements. The actuator may be, for example, a thermal-type actuator using heating elements or an electrostatic-type actuator using electrostatic force.

The head is not limited to the line-type head. The head may be a serial-type head in which ink is discharged from nozzles on a medium (an object to which ink is to be discharged) during movement of the head in a scanning direction parallel to the sheet width direction.

The medium is not limited to the sheet or paper, and may be a cloth, a substrate, and the like.

A liquid discharged from the nozzles is not limited to the ink, and may be any liquid (e.g., a treatment liquid that agglutinates or precipitates constituents of ink).

The present disclosure is applicable to facsimiles, copy machines, multifunction peripherals, and the like without limited to printers. The present disclosure is also applicable to a liquid discharge apparatus used for any other application than the image recording (e.g., a liquid discharge apparatus that forms an electroconductive pattern by discharging an electroconductive liquid on a substrate).

What is claimed is:

1. A liquid discharge head, comprising:

a first pressure chamber group formed by a plurality of pressure chambers arranged in a first direction;

a second pressure chamber group formed by a plurality of pressure chambers arranged in the first direction, and disposed side by side with the first pressure chamber group in a second direction intersecting with the first direction;

a first common channel extending in the first direction and communicating with the pressure chambers comprising the first pressure chamber group;

a second common channel extending in the first direction and communicating with the pressure chambers comprising the second pressure chamber group, the second common channel and the first common channel being arranged in the second direction;

a plurality of nozzles;

a plurality of communicating routes passing immediately above the nozzles;

a plurality of first connection channels connecting the pressure chambers composing the first pressure chamber group and the communicating routes;

a plurality of second connection channels connecting the pressure chambers comprising the second pressure chamber group and the communicating routes; and a first bypass disposed at one side in the first direction relative to the first pressure chamber group and the second pressure chamber group, and connecting the first common channel and the second common channel.

2. The liquid discharge head according to claim 1, further comprising a second bypass disposed at the other side in the first direction relative to the first pressure chamber group and the second pressure chamber group, and connecting the first common channel and the second common channel.

3. The liquid discharge head according to claim 1, wherein a supply opening is provided between both ends in the first direction of the first common channel, and a return opening is provided between both ends in the first direction of the second common channel.

4. The liquid discharge head according to claim 1, wherein a width in the first direction of the first bypass is wider than a width in the first direction of each of the pressure chambers comprising the first pressure chamber group, and the width in the first direction of the first bypass is wider than a width in the first direction of each of the pressure chambers comprising the second pressure chamber group.

* * * * *